United States Patent
Park et al.

(10) Patent No.: US 7,541,010 B2
(45) Date of Patent: Jun. 2, 2009

(54) SILVER DOPED CATALYSTS FOR TREATMENT OF EXHAUST

(75) Inventors: Paul Worn Park, Peoria, IL (US); Virgil Raymond Hester, Edelstein, IL (US); Christie Susan Ragle, Havana, IL (US); Carrie L. Boyer, Shiloh, IL (US)

(73) Assignee: Caterpillar Inc., Peoria, IL (US)

( * ) Notice: Subject to any disclaimer, the term of this patent is extended or adjusted under 35 U.S.C. 154(b) by 668 days.

(21) Appl. No.: 10/739,324

(22) Filed: Dec. 19, 2003

(65) Prior Publication Data

US 2005/0135980 A1 Jun. 23, 2005

(51) Int. Cl.
*B01D 53/56* (2006.01)
*B01D 53/94* (2006.01)
*F01N 3/20* (2006.01)
*G05D 99/00* (2006.01)
*H05H 1/00* (2006.01)

(52) U.S. Cl. .............. 423/213.2; 423/213.7; 423/239.1; 423/239.2; 423/DIG. 5; 423/DIG. 10; 422/105; 204/168; 204/169; 204/177; 204/179; 60/274; 60/282; 60/299

(58) Field of Classification Search .............. 423/213.2, 423/213.7, 239.1, 239.2, DIG. 5, DIG. 10; 204/168, 169, 177, 179; 422/105; 60/274, 60/282, 299

See application file for complete search history.

(56) References Cited

U.S. PATENT DOCUMENTS

| | | | |
|---|---|---|---|
| 3,986,350 A | 10/1976 | Schmidt | |
| 5,154,901 A | 10/1992 | Yoshida et al. | |
| 5,300,269 A * | 4/1994 | Aichinger et al. | ........ 423/239.1 |
| 5,458,748 A * | 10/1995 | Breault et al. | ............... 204/177 |
| 5,534,237 A * | 7/1996 | Yoshida et al. | ........... 423/239.1 |
| 5,559,072 A | 9/1996 | Itoh et al. | |
| 5,577,383 A | 11/1996 | Kuroda et al. | |
| 5,710,088 A | 1/1998 | Jen et al. | |
| 5,980,844 A | 11/1999 | Kharas | |
| 6,029,442 A * | 2/2000 | Caren et al. | .................... 60/275 |
| 6,066,587 A | 5/2000 | Kurokawa et al. | |
| 6,103,208 A * | 8/2000 | Ogawa et al. | ............. 423/213.2 |
| 6,153,162 A * | 11/2000 | Fetzer et al. | ............. 423/239.1 |
| 6,176,078 B1 | 1/2001 | Balko et al. | |
| 6,284,211 B1 | 9/2001 | Miyadera et al. | |
| 6,314,722 B1 | 11/2001 | Matros et al. | |

(Continued)

FOREIGN PATENT DOCUMENTS

JP 2002-370032 A 12/2002

OTHER PUBLICATIONS

Meunier, et al., "Mechanistic differences in the selective reduction of NO by propene over cobalt- and silver-promoted alumina catalysts: kinetic and in situ DRIFTS study," Catalysis Today 59 (2000), pp. 287-304.

(Continued)

*Primary Examiner*—Timothy C Vanoy
(74) *Attorney, Agent, or Firm*—Finnegan, Henderson, Farabow, Garrett & Dunner (57) ABSTRACT

A method of making an exhaust treatment element includes washcoating a substrate with a slurry that includes a catalyst support material. At least some of the catalyst support material from the slurry may be transferred to the substrate, and silver metal (Ag) is dispersed within the catalyst support material.

17 Claims, 7 Drawing Sheets

U.S. PATENT DOCUMENTS

| | | | |
|---|---|---|---|
| 6,321,531 B1 * | 11/2001 | Caren et al. | 60/275 |
| 6,365,118 B1 | 4/2002 | Kharas et al. | |
| 6,936,232 B2 * | 8/2005 | Gillespie et al. | 423/239.2 |
| 7,081,231 B1 | 7/2006 | Aardahl et al. | |
| 7,153,810 B2 * | 12/2006 | Park et al. | 502/217 |
| 7,374,728 B2 * | 5/2008 | Nakanishi et al. | 422/177 |
| 2002/0069642 A1 | 6/2002 | Dolling et al. | |
| 2005/0135977 A1 | 6/2005 | Park et al. | |
| 2006/0228283 A1 * | 10/2006 | Malyala et al. | 423/239.1 |

OTHER PUBLICATIONS

Abe, et al., "Effect of $SO_2$ on $NO_x$ reduction by ethanol over $Ag/Al_2O_3$ catalyst," Catalysis Letters 51 (1998), pp. 5-9.

Meunier, et al., "Effect of ex situ treatments with $SO_2$ on the activity of a low loading silver-alumina catalyst for the selective reductioin of NO and $NO_2$ by propene," Applied Catalysis B: Environmental 24 (2000), pp. 23-32.

Ukisu, et al., "Infrared study of catalytic reduction of lean NOx with alcohols over alumina-supported silver catalyst," Catalysis Letters 39 (1996), pp. 265-267.

Shimizu, et al., "Catalytic performance of $Ag-Al_2O_3$ catalyst for the selective catalytic reduction of NO by higher hydrocarbons," Applied Catalysis B: Environmental 25 (2000), pp. 239-247.

Miyadera, et al., "Alumina-supported Catalysts for the Selective Reduction of Nitric Oxide by Propene," Chemistry Letters (1993), pp. 1483-1486.

Miyadera, Tatsuo, "Alumina-supported silver catalysts for the selective reduction of nitric oxide with propene and oxygen-containing organic compounds," Applied Catalysis B: Environmental, 2 (1993), pp. 199-205.

Sumiya, et al., "Reduction of lean NOx by ethanol over $Ag/Al_2O_3$ catalysts in the presence of $H_2O$ and $SO_2$," Catalysis letters 50 (1998), pp. 87-91.

Chafik, et al., "In situ diffuse reflectance infrared Fourier transform spectroscopy study of surface species involved in NOx reduction by ethanol over alumina-supported silver catalyst," Journal of Molecular Catalysis A: Chemical 136 (1998), pp. 203-211.

JPO Machine Translation of JP 2002-370032.

* cited by examiner

SILVER DOPED CATALYSTS FOR TREATMENT OF EXHAUST

U.S. GOVERNMENT RIGHTS

This invention was made with government support under the terms of Contract No. DE-FC05-97OR22579 awarded by the Department of Energy. The government may have certain rights in this invention.

TECHNICAL FIELD

This invention relates generally to catalytic exhaust treatment elements and, more particularly, to methods for reducing NOx in exhaust streams using exhaust treatment elements including silver doped catalysts.

BACKGROUND

Internal combustion engines can produce exhaust streams that include various gases and combustion products. Some of these gases, such as nitrogen oxide gases (NOx) including, for example, nitrogen monoxide (NO) and nitrogen dioxide ($NO_2$), can contribute to environmental pollution in the form of acid rain and other undesirable effects. As a result, many regulations have been imposed on engine manufacturers in an attempt to reduce the levels of NOx emitted into the atmosphere.

NOx removal from the exhaust streams of lean burn engines can be especially challenging. Lean burn engines, which may include diesel engines as well as certain spark ignited engines, can operate with an excess of oxygen. Specifically, in a lean burn engine, more oxygen may be supplied to the engine than is necessary to stoichiometrically consume the fuel admitted to the engine. As a result, the exhaust streams of these lean burn engines may be rich in oxygen, which can limit the available techniques suitable for NOx removal.

To reduce the NOx concentrations in the exhaust stream of lean burning engines, a number of lean-NOx catalysts have been developed that may selectively reduce NOx in oxygen rich exhaust streams with hydrocarbon reductants. These lean-NOx catalytic systems may depend on the presence of sufficient levels of hydrocarbon species to be fully effective. The amount of hydrocarbons available in the exhaust streams of many lean burning engines can be low. Therefore, in some applications including active catalytic systems, a hydrocarbon compound such as diesel fuel, for example, may be introduced into the exhaust stream in order to promote reduction of NOx compounds.

Several lean-NOx catalysts have been developed that include alumina in some form. Alumina is known as a durable material, and it has shown promise as a catalyst for lean-NOx reactions at high temperatures. Nevertheless, even alumina-based catalysts have proven problematic. For example, certain catalysts or catalytic systems that have been used with lean burn engines can suffer from low NOx conversion efficiencies, inadequate catalyst durability, low thermal stability, narrow effective temperature ranges, and NOx selectivity limited to only certain compounds. Further, these catalysts and catalytic systems may be subject to sulfur poisoning from even minimal amounts of sulfur present in some fuels and certain lubricants. For example, sulfur, in the form of $SO_2$ present in an exhaust stream, can significantly reduce the NOx conversion effectiveness of a lean-NOx catalyst or catalytic system.

In an attempt to address the shortcomings of lean-NOx catalysts, various catalyst configurations and compositions have been proposed. For example, U.S. Pat. No. 5,980,844 ("the '844 patent") describes a NOx-reducing catalyst that includes silver oxide particles dispersed on alumina. The combination of the silver oxide particles and the alumina is meant to address the tendency of lean-NOx catalysts to deactivate in the presence of $SO_2$ when used to reduce NOx in automotive exhaust gases.

While the '844 patent addresses one deficiency of traditional lean-NOx catalysts, it fails to take into account the effects of various NOx gases and supplemental reductants in the exhaust stream. Further, the production of the small, widely dispersed silver oxide particles requires complex processing that can add to the manufacturing costs of the catalyst.

SUMMARY OF THE INVENTION

One aspect of the present invention includes a method of making an exhaust treatment element. The method may include washcoating a substrate with a slurry that includes a catalyst support material, transferring at least some of the catalyst support material from the slurry to the substrate, and dispersing silver metal within the catalyst support material to form a catalyst.

A second aspect of the present invention includes a method of removing NOx from an exhaust stream containing $SO_2$. The method may include flowing an exhaust stream containing $SO_2$ through an exhaust treatment element. At least some of the NOx from the exhaust stream may be removed through catalysis. The exhaust treatment element may include a substrate and a catalyst deposited on the substrate. The catalyst may include silver metal dispersed within a catalyst support material in an amount of between about 4% and about 10% by weight.

DETAILED DESCRIPTION

Figure 1:
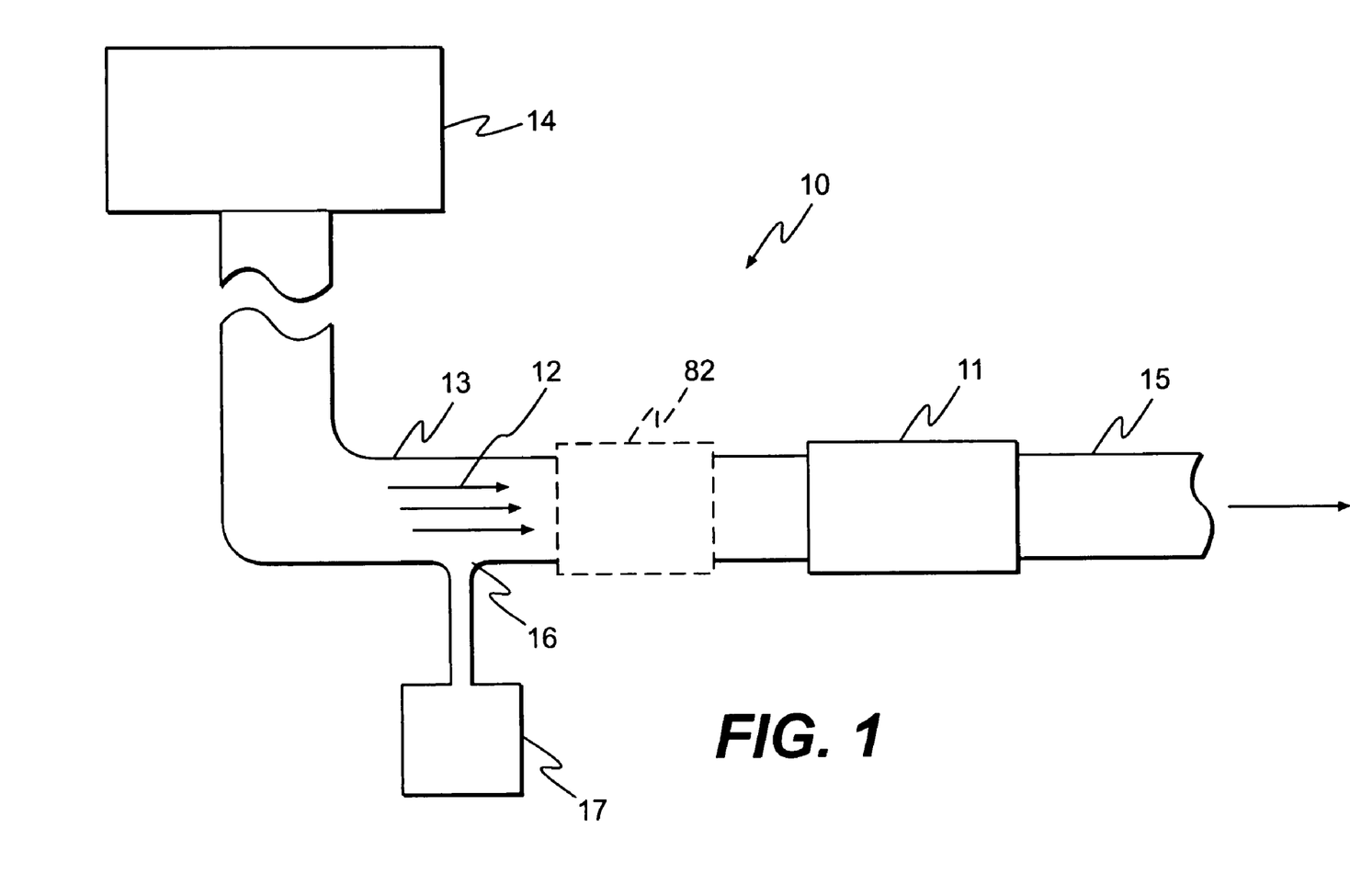
FIG. 1 is a diagrammatic illustration of an exhaust treatment system according to an exemplary embodiment of the present invention.

FIG. 1 illustrates an exemplary exhaust system 10 that may include an exhaust treatment element 11 for treating an exhaust stream 12 transferred through exhaust conduit 13. In one embodiment of the invention, exhaust stream 12 may be produced by a lean burn internal combustion engine 14, which may be a diesel engine, a spark ignited engine, or any other type of engine that may be operated with an excess of oxygen. Further, engine 14 may operate in either a stationary role (e.g., power plants, generators, etc.) or in a mobile capacity (e.g., vehicles, moving equipment, etc.). As a common trait of many lean burn engines, the excess oxygen present during combustion may yield NOx in the exhaust stream. Exhaust treatment element 11 may be provided in system 10 to convert at least some of the NOx from exhaust stream 12 into more benign compounds such as nitrogen gas ($N_2$), carbon dioxide, and water vapor, for example. These compounds may then be expelled into the atmosphere through an exhaust conduit 15.

Figure 2:
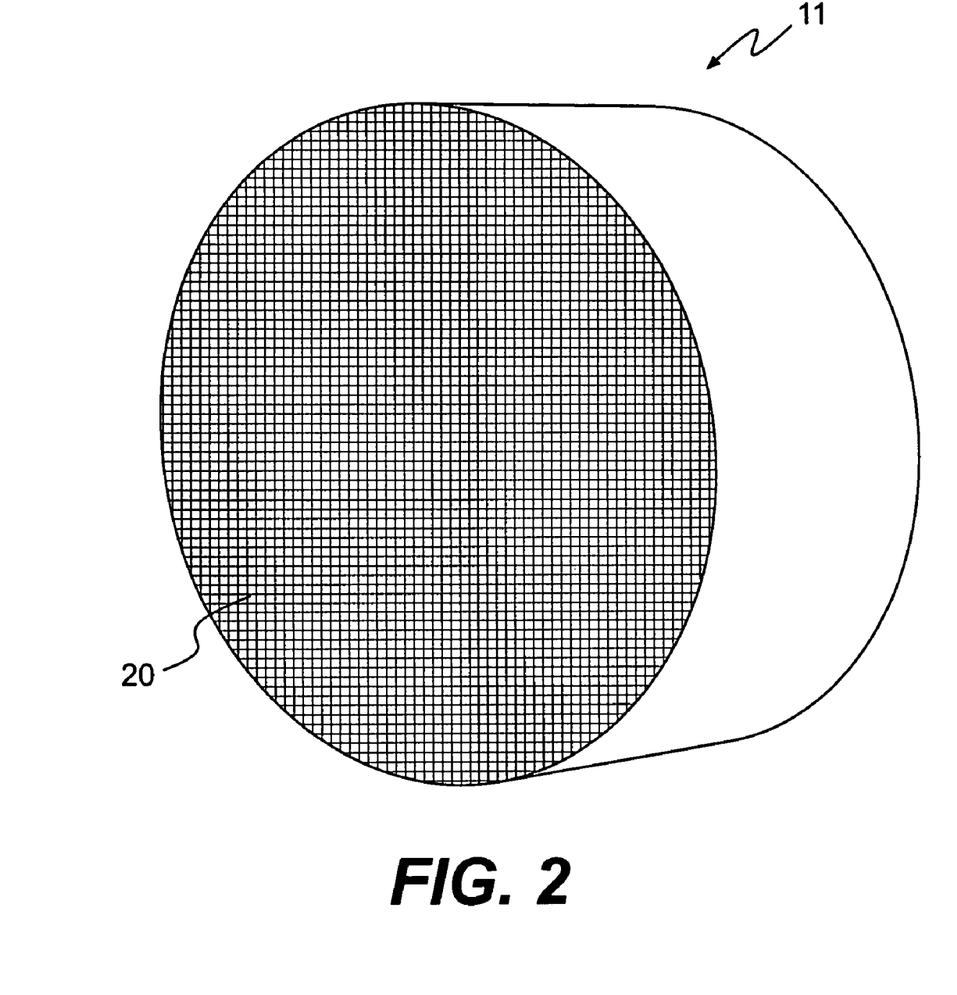
FIG. 2 is a pictorial representation of an exhaust treatment element according to an exemplary embodiment of the invention.

FIG. 2 illustrates exhaust treatment element 11 according to an exemplary embodiment of the invention. Exhaust treatment element 11 may be cylindrical, as shown, or any other suitable shape depending on a particular application. A plurality of channels 20 may be formed in exhaust treatment element 11. Channels 20 are openings defined by walls that form a honeycombed structure identified as substrate 30. The term "honeycomb," as used herein, may refer to a structure in which channels 20 have cross sections that may be hexagonal, rectangular, square, circular, or any other suitable shape. Channels 20 may extend through the entire length of exhaust treatment element 11 and allow the passage of exhaust stream 12 through exhaust treatment element 11. Further, catalyst components that may aid in the conversion of NOx in exhaust stream 12 may be deposited on the walls of channels 20.

Figure 3:
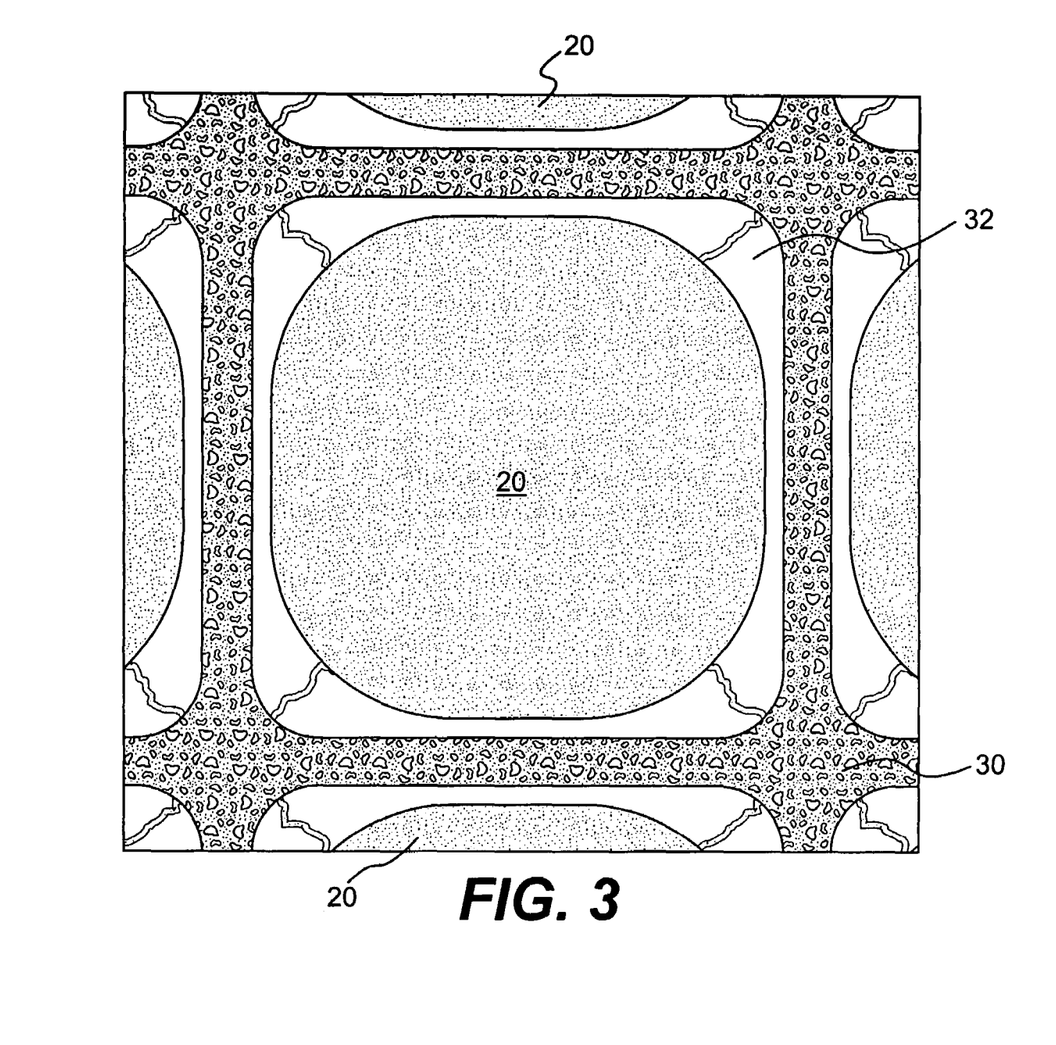
FIG. 3 is a diagrammatic cross-sectional representation of an exhaust treatment element according to an exemplary embodiment of the invention.

FIG. 3 provides a diagrammatic cross-sectional view of exhaust treatment element 11 looking along the longitudinal axis of exhaust treatment element 11. As shown, substrate 30 of includes channels 20 arranged in a honeycomb pattern. Substrate 30 may be a ceramic or a metallic substrate including at least one of alumina, cordierite, titania, and FeCr. Other materials, however, may also be used to form substrate 30.

Exhaust treatment element 11 may also include a catalyst 32 deposited on substrate 30. Catalyst 32 may include a catalyst support material and a metal promoter dispersed within the catalyst support material. The catalyst support material may include at least one of alumina, zeolite, aluminophosphates, hexaluminates, aluminosilicates, zirconates, titanosilicates, and titanates. In one embodiment of the invention, the catalyst support material may include at least one of γ-alumina and zeolite, and the metal promoter may include silver metal (Ag).

Preparation of exhaust treatment element 11 may be accomplished in a variety of ways. An alumina honeycomb or cordierite substrate 30 may be supplied, and catalyst 32 may be formed on substrate 30 using a washcoating technique, for example. As noted above, catalyst 32 can include at least two components; i.e., a catalyst support material and a metal promoter. In one embodiment, the catalyst support material may be loaded with the metal promoter prior to the washcoating process. Alternatively, in another embodiment, the catalyst support material may be washcoated onto substrate 30 without first being loaded with the metal promoter. In this process, the metal promoter may be loaded into the catalyst support material after the catalyst support material has been deposited on substrate 30.

The catalyst support material used to form catalyst 32 may be formed using a variety of techniques. For example, powders of γ-alumina, zeolite, aluminophosphates, hexaluminates, aluminosilicates, zirconates, titanosilicates, titanates, or any other suitable catalyst support material may be produced using sol gel, incipient wetness impregnation, or precipitation techniques.

The catalyst support material in powder form may be dispersed into a solvent including water, for example, to form a slurry. Other solvents may be used depending on the requirements of a particular application. This slurry can be washcoated onto substrate 30. Specifically, the slurry may be applied to the substrate in such a way that at least some of the catalyst support material in the slurry may be transferred to the substrate. For example, substrate 30 may be fully or partially immersed in the slurry. Alternatively, the slurry may be applied to substrate 30 by brushing, spraying, wiping, or any other suitable method. After applying the slurry containing the catalyst support material to substrate 30, the slurry may be allowed to dry, leaving the catalyst support material deposited on substrate 30.

Loading of the metal promoter into the catalyst support material may be accomplished using, for example, an incipient wetness impregnation technique. Other techniques for dispersing the metal promoter material in the catalyst support material, however, may also be suitable. In the incipient wetness technique, the catalyst support material may be brought into contact with a slurry of the metal promoter. Where the catalyst support material has been deposited on substrate 30, the entire structure, including substrate 30 and the catalyst support material, may be fully or partially immersed into the metal promoter-slurry. Alternatively, the metal promoter slurry may be applied by brushing, spraying, wiping, dripping, or any other suitable technique. In one embodiment of the invention, the amount of metal promoter slurry applied to the catalyst support material may be equal to or greater than a total pore volume of the catalyst support material.

Where the catalyst support material has not yet been deposited on substrate 30, the catalyst support material by itself may be contacted with the metal promoter slurry. For example, a pipette may be used to introduce the metal promoter slurry to the catalyst support material. A ball mill may also be used to promote homogeneous mixing of the catalyst support material and the metal promoter slurry.

The metal promoter slurry may be formed by dispersing a metal precursor into a solvent such as water, for example. In one embodiment of the invention, the metal promoter may be silver metal, and the metal precursor may include silver nitrates, acetates, chlorides, carbonates, sulfates, or any other suitable precursor.

Contacting the catalyst support material with the metal promoter slurry may have the effect of dispersing the metal promoter, e.g., silver metal, into the catalyst support material. In one embodiment of the invention, silver metal may be dispersed within the catalyst support material in an amount of between about 0.5% and about 10% by weight. In yet another embodiment of the invention, the silver metal may be dispersed within the catalyst support material in an amount of between about 4% and about 8% by weight.

Exhaust treatment element 11 may be subjected to additional processing steps including, for example, drying and/or calcining to remove volatile components from substrate 30 and catalyst 32. Drying may include placing exhaust treatment element 11 in a furnace at a particular temperature and for a particular amount of time. For example, exhaust treatment element 11 may be dried at a temperature of from about 100° C. to about 200° C. for several hours. Calcining may proceed for several hours at temperatures of greater than about 500° C. It will be appreciated that any particular time-temperature profile may be selected for the steps of drying and calcining without departing from the scope of the invention.

Exhaust treatment element 11 may aid in the reduction of NOx from exhaust stream 12 (FIG. 1). The lean-NOx catalytic reaction is a complex process including many steps. One of the reaction mechanisms, however, that may proceed in the presence of exhaust treatment 11 can be summarized by the following reaction equations:

$$NO+O_2 \rightarrow NOx \quad (1)$$

$$HC+O_2 \rightarrow \text{oxygenated HC} \quad (2)$$

$$NOx+\text{oxygenated HC}+O_2 \rightarrow N_2+CO_2+H_2O \quad (3)$$

Catalyst 32, which may include silver metal dispersed within a catalyst support material, may catalyze the reduction of NOx to $N_2$ gas, as shown in equation (3). Further, as shown in equation (2), a hydrocarbon reducing agent may be converted to an activated, oxygenated hydrocarbon that may interact with the NOx compounds to form organo-nitrogen containing compounds. These materials may possibly decompose to isocyanate (NCO) or cyanide groups and eventually yield nitrogen gas ($N_2$) through a series of reactions, which are summarized above.

While not necessary, a supplemental hydrocarbon reductant may be introduced into exhaust stream 12 (FIG. 1) in order to aid in the production of oxygenated hydrocarbons, as represented by equation (2). Supplemental reductants may include propene, ethanol, diesel fuel, or any other suitable hydrocarbons. As illustrated in FIG. 1, exhaust system 10 may include a fluid inlet 16 disposed on exhaust conduit 13 for introducing a supplemental reductant. Further, the supplemental reductant may be stored in a reservoir 17. In one embodiment of the invention, a supplemental reductant consisting of diesel fuel may be supplied to exhaust stream 12. In this embodiment, reservoir 17 may coincide with the fuel tank of a vehicle.

The amount of silver metal dispersed in catalyst 32 has been found to have a significant effect on NOx reduction performance in the presence of various reductants and/or $SO_2$. To achieve maximum NOx performance using a silver loaded catalyst, a separate catalyst formulation may be developed for each exhaust environment according to the type of reductants present in exhaust stream 12 and whether or not $SO_2$ is present in exhaust stream 12.

Figure 4:
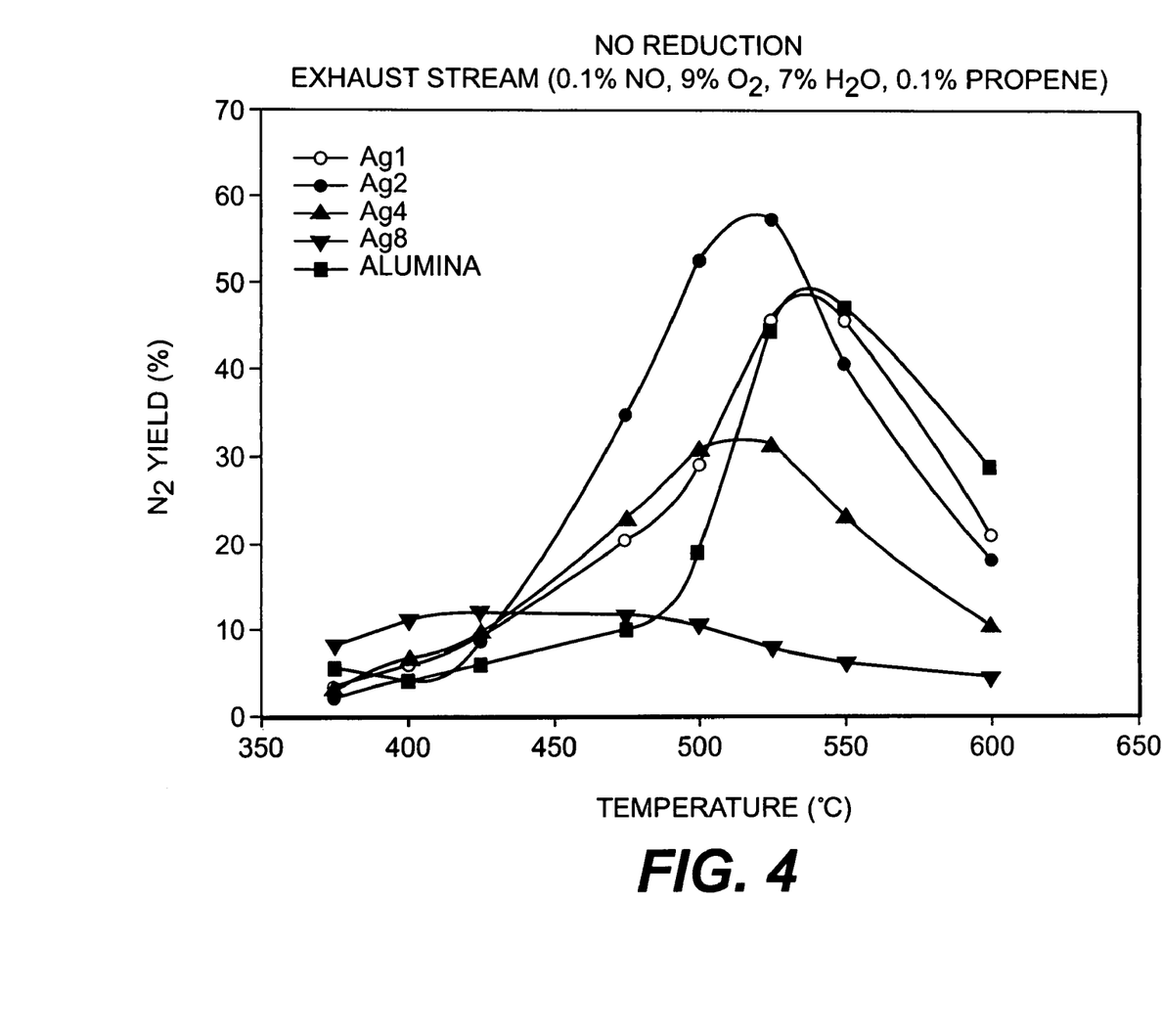
FIG. 4 is a graph that plots NOx conversion percentage as a function of temperature and silver metal loading for various samples in an exhaust stream containing propene and NO.

FIG. 4 is a graph that plots $N_2$ yield as a function of temperature for NO reduction over various silver doped alumina catalysts. For example, the curve designated as Ag1 represents data for alumina catalysts doped with 1% silver metal by weight. Similarly, the curves designated as Ag2, Ag4, and Ag8 represent data for alumina catalysts doped with 2% silver metal by weight, 4% silver metal by weight, and 8% silver metal by weight, respectively. The NO conversion performance for an undoped alumina catalyst is also included in FIG. 4 for reference. The exhaust stream flowed over each of the catalysts included 0.1% NO, 9% $O_2$, and 7% $H_2O$ at a space velocity of 30,000 $h^{-1}$. The exhaust stream also included a hydrocarbon reductant in the form of 0.1% propene.

The undoped alumina catalyst had a maximum NO conversion efficiency of 50% at a $T_{max}$ (i.e., temperature at maximum NOx conversion) of about 540° C. Each of the silver doped alumina catalysts had a lower $T_{max}$ and exhibited a broader temperature window of operation, as compared to the undoped alumina catalyst. Of all the catalysts, the Ag2 catalyst demonstrated the highest NO reduction performance with the highest $N_2$ yield of 58% at a temperature of about 525° C. The performance of NO reduction over the silver doped catalysts, however, significantly decreased as the amount of silver present in the catalyst increased above about 4%.

Figure 5:
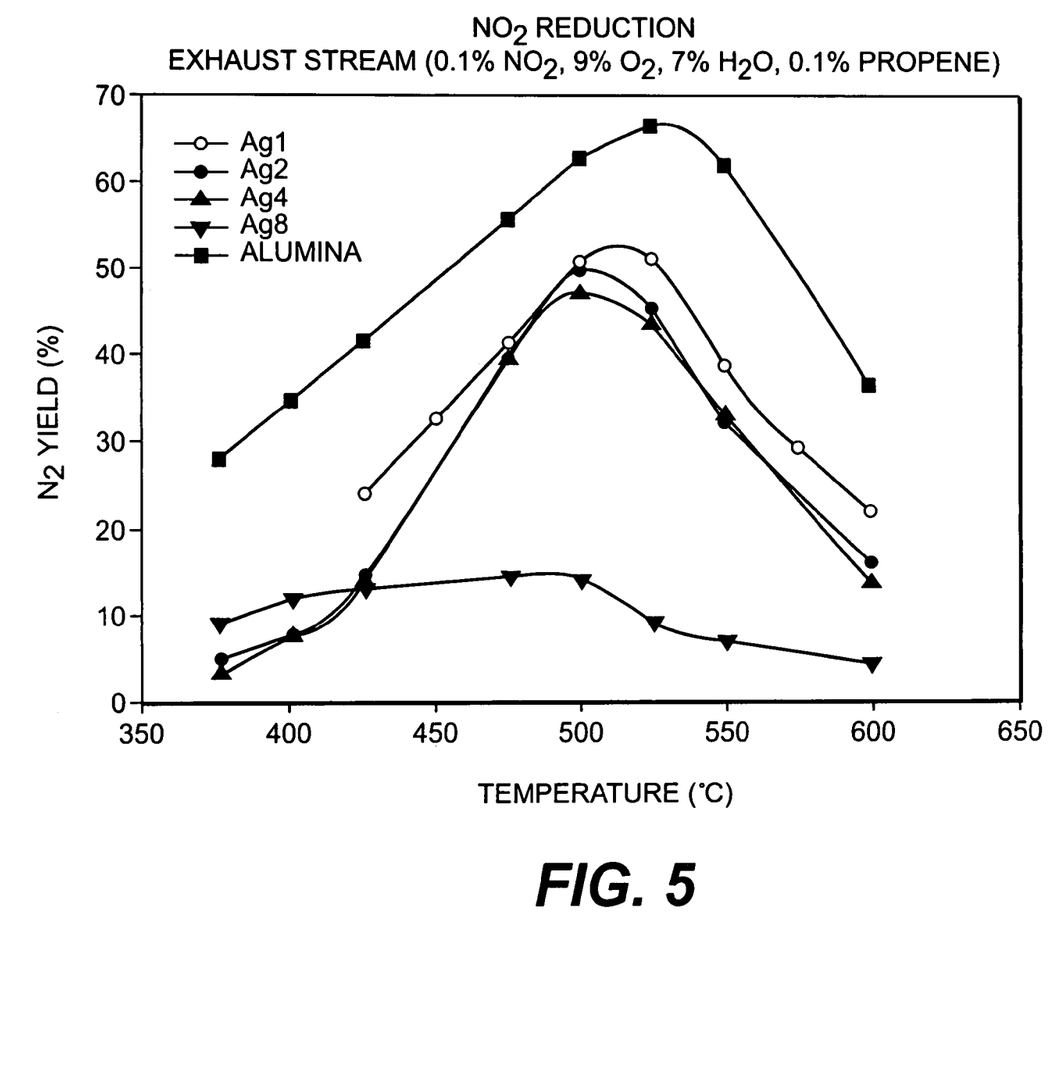
FIG. 5 is a graph that plots NOx conversion percentage as a function of temperature and silver metal loading for various samples in an exhaust stream containing propene and $NO_2$.

FIG. 5 is a graph that plots $N_2$ yield as a function of temperature for $NO_2$ reduction over 1 wt. % (Ag1), 2 wt. % (Ag2), 4 wt. % (Ag4), and 8 wt. % (Ag8) silver doped alumina catalysts. The $NO_2$ conversion performance for an undoped alumina catalyst is also included in FIG. 5 for reference. The exhaust stream flowed over each of the catalysts included 0.1% $NO_2$, 9% $O_2$, and 7% $H_2O$ at a space velocity of 30,000 $h^{-1}$. The exhaust stream also included a hydrocarbon reductant in the form of 0.1% propene.

Of all the samples, the undoped alumina catalyst demonstrated the best $NO_2$ reduction performance over the entire-range of measured temperatures. This result may indicate that there is little or no enhancement in catalytic performance with the addition of silver on alumina when NO is replaced with $NO_2$ in an exhaust stream including a propene reductant. While each of the Ag1, Ag2, and Ag4 catalysts had similar maximum $NO_2$ reductions of from about 45% to about 50%, the Ag8 catalyst, which included the highest degree of silver loading, reduced less than 15% of $NO_2$ at temperatures above 425° C.

Based on considerations including the results shown in FIG. 4 and FIG. 5, a suitable catalyst for the reduction of NOx from an exhaust stream including a propene reductant and excluding $SO_2$ may include silver metal dispersed in a catalyst support material in an amount of from about 1.5% to about 3% by weight. Such a catalyst would reduce both NO and $NO_2$ in the presence of propene, while substantially avoiding the decline in NOx conversion performance that may occur under these conditions as the level of silver metal loading increases. In this catalyst, the catalyst support material may include at least one of γ-alumina and zeolite. A similar catalyst would also be useful in an exhaust stream that contained ethanol as a reductant in addition to or in place of propene.

Another important consideration in the design of lean-NOx reduction catalysts is whether or not the exhaust includes $SO_2$. Diesel fuel may include sulfur compounds, and as a result, the exhaust stream of diesel engines may include significant amounts of $SO_2$. Further, in certain systems, diesel fuel may be used as a supplemental reductant, and therefore, may provide a source of additional sulfur to the exhaust stream. The presence of $SO_2$ in the exhaust stream is an important catalyst design consideration because $SO_2$ may poison NOx reduction catalysts by contaminating or blocking active sites on the catalysts. As a result, the presence of $SO_2$ in an exhaust stream can negatively impact the NOx reduction performance of many catalysts.

Figure 6:
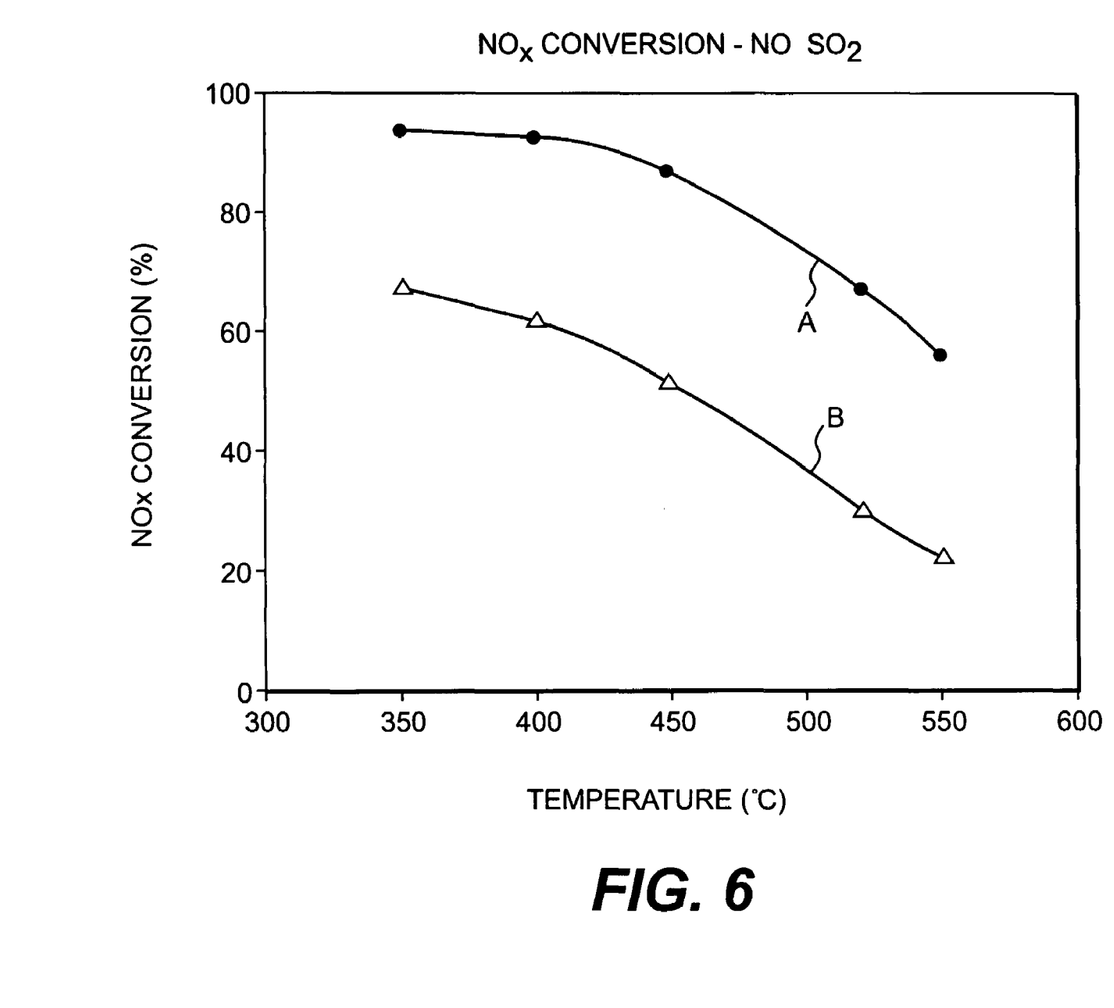
FIG. 6 is a graph that plots NOx conversion percentage as a function of temperature and silver metal loading for various samples in an exhaust stream not containing $SO_2$.

Studies of NOx reduction performance of catalysts in exhaust streams that include $SO_2$ have demonstrated an unexpected correlation between the degree of silver loading and the presence of $SO_2$ in the exhaust. For example, FIG. 6 is a graph that represents NOx conversion efficiency as a function of temperature for catalysts operating in an exhaust stream that does not include $SO_2$. Line A includes data for catalysts including silver metal in an amount of about 0.5% to about 3% by weight dispersed in a catalyst support material of γ-alumina, for example. Line B includes data for catalysts including higher silver metal loading values. Specifically, the catalysts characterized by line B can include silver metal in an amount of 4% to about 10% by weight dispersed in a catalyst support material of γ-alumina, for example. As illustrated by FIG. 6, catalysts that are highly loaded with silver (i.e., greater than about 4% by weight) may exhibit lower NOx reduction efficiencies as compared to catalysts loaded with less silver when placed in an exhaust stream that contains substantially no $SO_2$. This result is consistent with the results shown by FIG. 4 and FIG. 5, which show a reduction in NOx conversion performance for catalysts highly doped with silver.

Figure 7:
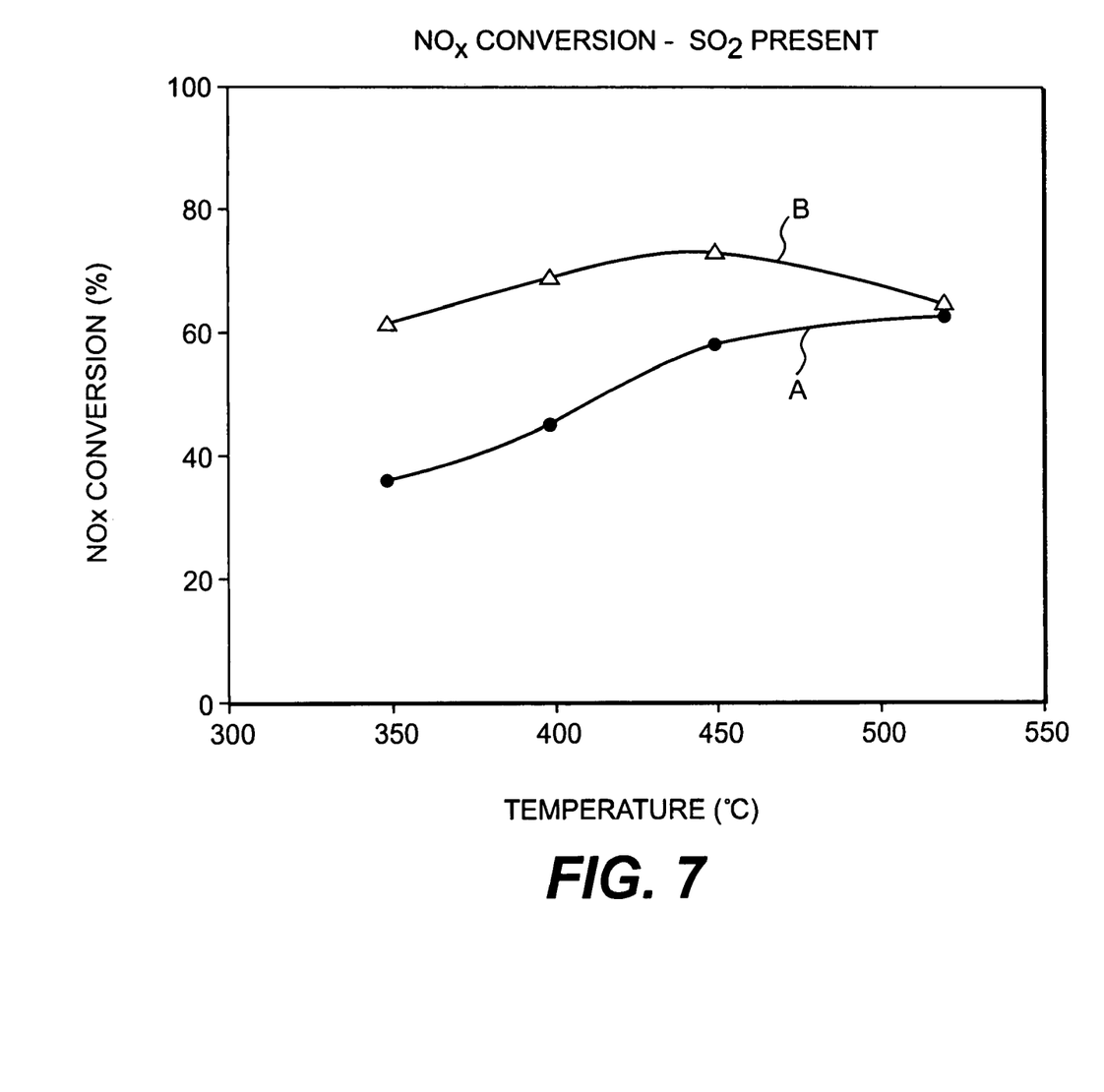
FIG. 7 is a graph that plots NOx conversion percentage as a function of temperature and silver metal loading for various samples in an exhaust stream containing $SO_2$.

FIG. 7 is a graph that represents NOx conversion efficiency as a function of temperature for catalysts operating in an exhaust stream that includes $SO_2$ in an amount of between about 2 ppm (parts-per-million) to about 300 ppm. Similar to FIG. 6, line A in FIG. 7 includes data for catalysts including silver metal in an amount of about 0.5% to about 3% by weight dispersed in a catalyst support material of γ-alumina, for example. Line B includes data for catalysts including higher silver metal loading values of from about 4% to about 10% by weight dispersed in a catalyst support material of γ-alumina, for example. As illustrated by FIG. 7, catalysts that are highly loaded with silver (i.e., greater than about 4% by weight) may exhibit higher NOx reduction efficiencies as compared to catalysts loaded with less silver when placed in an exhaust stream that contains $SO_2$. Unexpectedly, the NOx reduction performance of highly loaded silver doped catalysts has been found to improve in the presence of $SO_2$ in the exhaust stream. Thus, as suitable catalyst for use in deNOx treatment of exhaust streams containing $SO_2$ may include silver metal dispersed within a catalyst support material in an amount of between about 4% and about 10% by weight. The catalyst support material may include, for example, at least one of γ-alumina and zeolite.

The formulation of the catalysts of the present invention may also depend on the presence or absence of certain supplemental systems acting on exhaust stream 12. For example, returning to FIG. 1, exhaust system 10 may optionally include a non-thermal plasma reactor 82 placed upstream from exhaust treatment element 11. Non-thermal plasma reactor 82 can be an electronic device that may activate particles/molecules in exhaust stream 12.

Plasma generated in reactor 82 may induce a number of simultaneous reactions with fuel to produce a substantial amount of oxygenated and non-oxygenated, unbranched organic molecules at relatively low temperatures that are highly reactive and ideally suited for use as a reducing agent. For example, NO may become $NO_2$, and hydrocarbons may become partially oxygenated hydrocarbons. The activation of these species may reduce. the need for silver or other active elements in catalyst 32. In fact, excess silver under these conditions may contribute to oxidation of hydrocarbons to form carbon dioxide rather than the intended reaction of converting NOx to $N_2$.

In one embodiment, exhaust treatment element 11 may be used in conjunction with non-thermal plasma reactor 82 to remove at least some NOx from exhaust stream 12, which may contain at least one of $NO_2$, hydrocarbon radicals, and partially oxygenated hydrocarbons. In this embodiment, catalyst 32 deposited on substrate 30 (FIG. 3) of exhaust treatment 11 may include silver metal dispersed within a catalyst support material in an amount of between about 0.5% and about 2% by weight. Exhaust system 10 may also include fluid inlet 16 and reservoir 17 for supplying a supplemental reductant to exhaust stream 12.

INDUSTRIAL APPLICABILITY

The lean-NOx catalysts of the present invention may be useful in any of a wide variety of applications where reduction of NOx from exhaust streams would be desirable. Through various levels of silver loading in a catalyst support material, the catalysts of the present invention may be especially suited for removal of NOx from exhaust streams that include $SO_2$ and/or reductants such as propene, ethanol, and diesel fuel. For example, the catalysts of the present invention may offer high deNOx conversion efficiencies and broad operating temperature windows in the presence of various reductants. Further, the catalysts may exhibit resistance to poisoning or deactivation from $SO_2$.

Additionally, one embodiment of the present invention may offer a simplified method of fabricating a lean-NOx catalyst. For example, a washcoating process for depositing a catalyst support material preloaded with silver is complex and may depend greatly on the amount of silver present. Conversely, however, dispersing silver metal into a catalyst support material after the catalyst support material has already been washcoated onto a substrate may reduce the complexity of the fabrication process.

Specifically, in order to washcoat a catalyst support material preloaded with silver, the washcoating parameters must be adjusted for every variation in silver loading percentage. For example, the percentage of silver loading may dictate the preferred washcoating slurry pH, viscosity, and average size of the particles dispersed in the slurry. Washcoating using a non-loaded catalyst support material does not depend on the percentage of metal present in the catalyst support material. Therefore, rather than requiring a plurality of different sets of washcoating parameters depending on the metal promoter loading percentage, only one set of washcoating parameters may be required. Fabricating catalysts by washcoating with non-loaded catalyst support materials may lead to catalysts with more uniform deNOx performance characteristics.

It will be apparent to those skilled in the art that various modifications and variations can be made in the described catalyst systems without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of removing NOx from an exhaust stream containing $SO_2$, the method comprising:
   flowing substantially an entirety of an exhaust stream containing $SO_2$ through an exhaust treatment element and a plasma reactor upstream of the exhaust treatment element; and
   removing at least some of the NOx from the exhaust stream through catalysis,
   wherein the exhaust treatment element includes:
   a substrate, and
   a catalyst deposited on the substrate, the catalyst including silver metal dispersed within a catalyst support material in an amount of between 6% and about 10% by weight.

2. The method of claim 1, wherein the $SO_2$ is present in the exhaust stream in an amount of between about 2 ppm and about 300 ppm.

3. The method of claim 1, further including introducing a hydrocarbon reductant into the exhaust stream as a supplemental reductant.

4. The method of claim 1, wherein the catalyst support material includes at least γ-alumina.

5. The method of claim 1, wherein the catalyst support material includes at least zeolite.

6. The method of claim 1, further comprising inducing simultaneous reactions, including at least one of converting NO to $NO_2$ and converting hydrocarbons to partially oxygenated hydrocarbons, to prevent oxidation of hydrocarbons into carbon dioxide.

7. The method of claim 1, wherein the catalyst support material includes at least one of aluminophosphate and hexaluminate.

8. The method of claim 1, wherein the catalyst support material includes at least one of aluminosilicate and titanosilicate.

9. The method of claim 1, wherein the catalyst support material includes at least zirconate.

10. The method of claim 1, wherein the catalyst support material includes at least titanate.

11. The method of claim 1, wherein the catalyst including silver metal is dispersed within the catalyst support material in an amount of about 8% by weight.

12. A method of removing NOx from an exhaust stream based in part on the composition of the exhaust stream, comprising:

considering the composition of the exhaust stream; and removing at least some of the NOx from the exhaust stream by flowing the exhaust stream through a silver-loaded catalytic exhaust treatment element selected based in part on the composition of the exhaust stream, the silver in the silver-loaded catalytic exhaust treatment element being dispersed within a catalyst support material in an amount of between 6% and about 10% by weight.

13. The method of claim 12, wherein, in the removing step, the catalyst support material in which the silver in the silver-loaded catalytic exhaust treatment element is dispersed includes at least zeolite.

14. A method of tailoring NOx removal to composition of an exhaust stream, comprising:

considering the composition of an exhaust stream for an engine; and providing the engine with a silver-loaded catalytic exhause treatment element including silver metal in an amount based in part on whether or not $SO_2$ is present in the exhause stream of the engine.

15. The method of claim 14, wherein, in the providing step, the amount of silver metal is also based on whether or not a reductant is present in the exhaust stream and, if a reductant is present in the exhaust stream, further depends on the type of the reductant present in the exhaust stream.

16. The method of claim 15, wherein, in the providing step, the amount of silver metal is between about 1.5% and about 3% by weight when $SO_2$ is not present in the exhaust stream and a propene reductant is present in the exhaust stream.

17. The method of claim 14, in the providing step, the amount of silver metal is between about 4% and about 10% by weight when $SO_2$ is present in the exhaust stream.

* * * * *